United States Patent [19]

Wood

[11] Patent Number: 4,622,196
[45] Date of Patent: Nov. 11, 1986

[54] LINING OF PIPELINES AND PASSAGEWAYS

[75] Inventor: Eric Wood, Northants, England

[73] Assignee: Insituform Holdings Limited, St. Helier, Channel Islands

[21] Appl. No.: 689,193

[22] Filed: Jan. 7, 1985

[30] Foreign Application Priority Data

Jan. 7, 1984 [GB] United Kingdom ................ 8400365

[51] Int. Cl.$^4$ ............................................. B29C 41/32
[52] U.S. Cl. .................................... 264/229; 156/287; 156/293; 264/269; 264/516
[58] Field of Search ........................ 264/516, 269, 229; 156/287, 293, 165

[56] References Cited

U.S. PATENT DOCUMENTS

| 3,494,813 | 2/1970 | Lawrence et al. | 264/516 |
| 4,064,211 | 12/1977 | Wood | 156/294 |
| 4,368,091 | 1/1983 | Ontsuga et al. | 264/269 |
| 4,432,824 | 2/1984 | Cook et al. | 156/165 |
| 4,434,115 | 2/1984 | Chick | 264/36 |

FOREIGN PATENT DOCUMENTS 1449455 9/1976 United Kingdom .

Primary Examiner—Donald Czaja
Assistant Examiner—Mary Lynn Fertig
Attorney, Agent, or Firm—David A. Jackson

[57] ABSTRACT

The invention provides that in inserting a resin impregnated liner into a pipeline or passageway and shaping same to the passageway surface, followed by curing of the resin to form a rigid lining inside the pipeline or passageway, there are placed in the passageway reinforcing circumferential coils or members which bond to the liner and provide extra resistance to compressive hoop stress.

16 Claims, 1 Drawing Figure

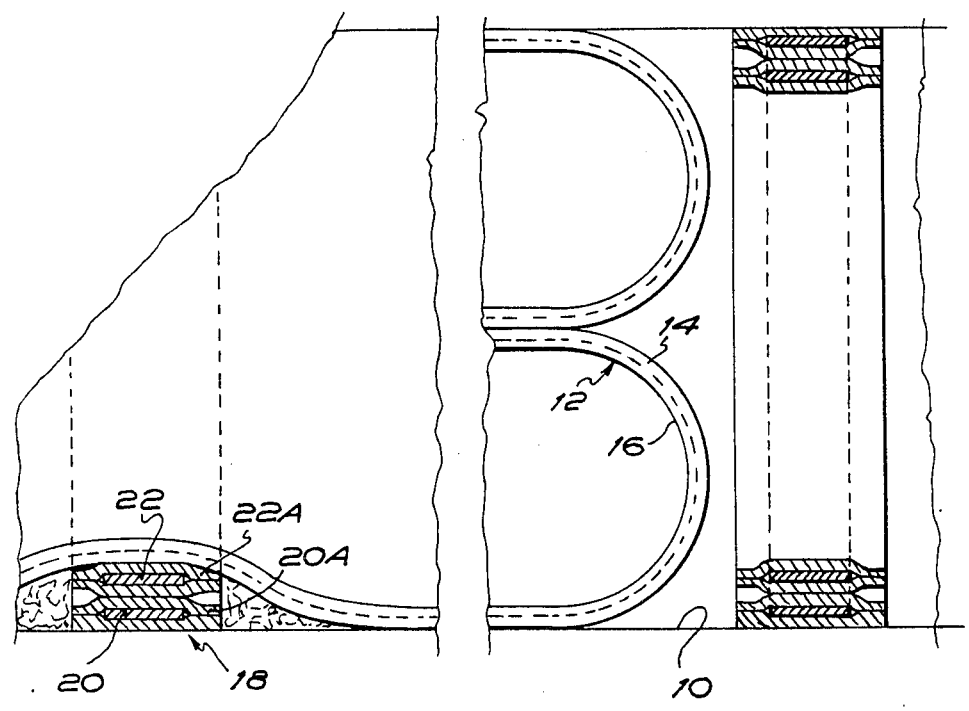

LINING OF PIPELINES AND PASSAGEWAYS

This invention relates to the lining of pipelines and passageways by the now well established and successful method of shaping a lining tube, which is flexible in nature when installed, to the pipeline or passageway surface, and then curing synthetic resin embodied in the lining of thickness to a hard state, whereby the lining becomes free standing and is shaped to the pipeline or passageway surface.

In the most widely practiced form of this invention, for example as disclosed in British Pat. No. 1,449,455, the flexible lining tube comprises layer of fibrous material, such as a needled felt which is impregnated with the curable resin, the felt or fibrous material forming an ideal absorbing material ensuring the effective take-up of the resin to provide a finished liner of the required thickness. Bonded to one side of this fibrous material is an impermeable (for example polyurethane) film. When the lining is first manufactured, the film is to the outside of the felt material, which enables impregnation by charging a quantity of resin into the inside of the flexible tube and then by squeezing the tube for example by passing it through nip rollers, in order to ensure even distribution of the resin in the felt material.

When the flexible lining tube is inserted in the pipeline or passageway, one end of it is anchored, and then the remainder of the tube is everted through the anchored end so that the tube everts into the pipeline or passageway, and onto the surface to be lined. The everting medium is usually a liquid, and when the eversion process is completed, the liquid stays inside the everted tube to keep it to the pipeline or passageway surface shape whilst the resin cures. To this end, heat may be circulated through the everted tube in order to effect or accelerate the cure initiation process. After curing has commenced with the type of resin normally used, the cure usually continues naturally until curing is completed.

In another embodiment of carrying out the lining process, the lining tube is not everted, but is fed into the pipeline or passageway and then is inflated using fluid pressure to shape the lining tube to the passageway surface. In this arrangement, the lining tube must be constructed differently, and has to be provided with an internal plastic impermeable membrane in the form of a tube, for effecting the inflation process. Optionally, the lining may be provided with an outer membrane to prevent contact with the resin.

In each case, the lining tube is of course flexible and manipulable, even when impregnated with resin, prior to the insertion step. In each case however the lining tube is tailored to the size of the pipeline or passageway to be lined, so that the tube will not suffer excessive tension or stretching when it is held to the pipeline or passageway surface.

The lining tube eventually forms a hard self supporting shell inside the passageway, and this shell has shown itself to be extremely useful for sealing the pipeline or passageway, and also for enabling change of the use of the pipeline or passageway. For example the lining may be put in place where it is desired that the passageway or pipeline should carry a corrosive material for which it was otherwise unsuitable.

However, there are circumstances, especially in the application of the process to the lining of large diameter pipelines of passageways e.g. of the order of 6 feet in diameter where lining compressive hoop strength becomes a factor in deciding whether or not the above described process is acceptable. Where a large diameter underground passageway is located in a position where there are high water table forces, if the lining does not have sufficient compressive hoop strength, then there is a danger that it will collapse under the external water table pressure. From a design point of view one can increase the thickness of the lining as related to the anticipated external pressure which will be experienced, but calculations for large diameter linings in moderate water table locations suggest that linings of 30 millimeter thickness are required. To insert linings of this thickness not only is technically extremely difficult, but makes the process so uneconomical as not to be viable. The present invention is concerned with a means for adding compressive hoop strength to the lining, and in accordance with the method, prior to inserting the flexible tubular lining, there are inserted in the pipeline or passageway strengthening bands, for example of steel or the like which are encased in jackets of resin impregnated material, and whilst the resin impregnating the jackets is still wet, and when the steel bands are in position, the application of the resin impregnated liner takes place so that the impregnated fibrous layer is brought face to face with the impregnated jackets, so that the resin of the respective components can fuse and the jackets and hence the steel bands will bond to the cured lining. This method enhances the strength of the cured lining considerably to such an extent that whereas a 30 millimeter lining might be suggested from design considerations, by using the steel band reinforcement, a tubular lining of the order of 9 millimeters may be employed satisfactorily. In such a circumstance, the pipeline or passageway diameter might be of the order of 6 feet, the steel bands may be positioned in the pipeline or passageway at 12 inch centres, and at each of the said centres the steel bands may be arranged in an assembly of two each with its resin impregnated jacket or envelope, which might suitably comprise a pair of rings which overlap the respective sides of the steel rings, so that their overlapping portions contact whereby there will be a solid body of resin around each steel ring anchoring it to the lining when final cure has been completed.

The steel rings have a high modulus of elasticity of the order of 300 times that of the resin (when cured) which is typically used for this process, being a polyester resin.

In a practical application, the steel rings might be 2.5 inch wide by an ⅛ of an inch thick, and they may be placed in position prior to the insertion of the tubular lining material.

The tubular lining material may be applied by the inversion process described above, or by being pulled in and inflated also as described above.

The accompanying diagrammtic drawing illustrates the application of the invention, and the single FIGURE is a section of a pipeline or passageway which is being lined according to the method.

Referring to the drawing, reference 10 denotes a passageway which is being lined by everting a lining tube 12 into and along the passageway as more fully described in British Pat. No. 1449455. In accordance with the known technique, the lining tube comprises an inner layer 14 which is a resin impregnated felt, and an outer layer which is an impermeable membrane 16. The tube is inverted as shown in the drawing by fluid pressure in any suitable manner. If the pipe 10 is, as is the case here, of large diameter of the order of 6 feet, then possibly air with appropriate lubricant can be used for everting the lining 12. The felt material 14 is impregnated with a resinous substance, typically a polyester resin which cures hard to form a rigid lining inside the pipeline when eversion has been completed.

In accordance with the method of the present invention, at 12 inch centres along the length of the pipe 10 are steel reinforcing ring assemblies 18 comprising a pair of steel rings 20, 22, and each steel ring 20, 22 is encased in an envelope or jacket 20A, 22A made up of a pair of bands of the same felt material as the layer 14, and impregnated with the same resin. As the eversion proceeds, so the resin impregnated layer 14 contacts the impregnated bands 20A, 22A, and the resin in effect merges with the resin impregnating the bands so as to form a coherent resin mass which eventually cures, whereby the steel rings 20 and 22 become anchored to the cured lining 12 and reinforce same, whereby the lining tube can withstand much greater compressive hoop stress pressures.

Instead of everting the tube 12 over the reinforcing ring assemblies 18, it is possible to insert the lining tube by pulling same into the pipeling 10 and inflating the tube so that the resin impregnated layer thereof contacts and becomes bonded to the resin impregnated bands 20A and 22A.

The assemblies 18 may be placed in position in the pipeline 10 as much as 24 hours before the lining operation comprising inserting the lining 12 takes place.

Curing can be effected by the application of heat or, where appropriate resin is used, by light radiation curing.

This invention can be practiced in an embodiment wherein the reinforcement bands, typically steel bands, are spirally wound with the coils overlapping so that the steel bands continuously line the surface. Such reinforcement when of metal requires to be coated to protect it from corrosion, and preferably in the above described embodiments, the coating may be of felt or like material to which resin impregnated lining bonds. The bonding is of significance when the lining will be subjected to external pressure but when it is subject to internal pressure, the bonding aspect is not so important as the reinforcing rings will take much of the pressure loading by virtue of their position to the outside of the lining.

It is not essential that the reinforcing bands be of metal but they should be of a higher modulus that the flexible lining when cured.

In another embodiment when applied to smaller diameter passageways and when the loadings are smaller the reinforcing may be in the nature of piano wire provided with a suitable protective coating such as UPVC (a polyvinyl chloride resin coating material).

I claim:

1. A method of lining a pipeline or passageway comprising the following steps:
   A. inserting into the pipeline or passageway at spaced intervals one or more assemblies, each assembly comprising (i) a band of resin absorbent material impregnated with a curable synthetic resin and (ii) a ring of reinforcing material of narrower width than the band of absorbent material and located in relation thereto so that the absorbent material overlaps the edges of the band;
   B. inserting into the pipeline or passageway before the resin impregnating said bands of material has cured, a resin impregnated tubular lining presenting a face of uncured resin to said assemblies so that the uncured resin face of the liner comes into resin contact with the overlapping portions of the bands of material; and
   C. curing the resin of the bands of material and the liner whereby the reinforcing rings become embedded in cured resin and provide compressive hoop stress reinforcement for the liner.

2. A method according to claim 1, wherein the assemblies inserted in Step A comprise strengthening bands of a rigid supporting material each encased in jackets of resin impregnated material; and wherein the resin impregnated tubular lining is inserted as in Step B while the resin impregnating the said jackets is still wet, and wherein the impregnated fibrous layer of said resin impregnated tubular lining is brought into face to face contact with the said impregnated jacket so that the resin of the liner and the respective jackets can fuse, and the jacket and hence the bands will bond to the cured lining.

3. A method according to claim 1 wherein the lining comprises a flexible tube of resin absorbent material which is surrounded by a membrane, and the absorbent layer is impregnated with resin, and the tubular lining is inverted into the pipeline or passageway after the placement of the said assemblies.

4. A method according to claim 2, wherein the lining comprises a flexible tube of resin absorbent material which is surrounded by a membrane, and the absorbent layer is impregnated with resin, and the tubular lining is inverted into the pipeline or passageway after the placement of the said assemblies.

5. A method according to claim 1, wherein the resin is cured by the application of heat or in the alternative where a light curing resin is used, by the application of light radiation.

6. A method according to claim 2, wherein the resin is cured by the application of heat or in the alternative where a light curing resin is used, by the application of light radiation.

7. A method according to claim 3, wherein the resin is cured by the application of heat or in the alternative where a light curing resin is used, by the application of light radiation.

8. A method according to claim 4, wherein the resin is cured by the application of heat or in the alternative where a light curing resin is used, by the application of light radiation.

9. A method according to claim 1, wherein the said bands are of steel and have a modulus of elasticity of the order of 300 times that of the cured resin.

10. A method according to claim 2, wherein the said bands are of steel and have a modulus of elasticity of the order of 300 times that of the cured resin.

11. A method according to claim 3, wherein the said bands are of steel and have a modulus of elasticity of the order of 300 times that of the cured resin.

12. A method according to claim 4, wherein the said bands are of steel and have a modulus of elasticity of the order of 300 times that of the cured resin.

13. A method according to claim 5, wherein the said bands are of steel and have a modulus of elasticity of the order of 300 times that of the cured resin.

14. A method according to claim 6, wherein the said bands are of steel and have a modulus of elasticity of the order of 300 times that of the cured resin.

15. A method according to claim 7, wherein the said bands are of steel and have a modulus of elasticity of the order of 300 times that of the cured resin.

16. A method according to claim 8, wherein the said bands are of steel and have a modulus of elasticity of the order of 300 times that of the cured resin.

* * * * *